United States Patent
Lacy

(10) Patent No.: US 9,213,111 B2
(45) Date of Patent: Dec. 15, 2015

(54) NEUTRON DETECTORS FOR ACTIVE INTERROGATION

(75) Inventor: Jeffrey Lacy, Houston, TX (US)

(73) Assignee: Proportional Technologies, Inc., Houston, TX (US)

( * ) Notice: Subject to any disclaimer, the term of this patent is extended or adjusted under 35 U.S.C. 154(b) by 402 days.

(21) Appl. No.: 13/106,818

(22) Filed: May 12, 2011

(65) Prior Publication Data

US 2011/0278468 A1 Nov. 17, 2011

Related U.S. Application Data

(60) Provisional application No. 61/333,990, filed on May 12, 2010.

(51) Int. Cl.
- *H01J 47/02* (2006.01)
- *G01T 3/00* (2006.01)
- *G01V 5/00* (2006.01)

(52) U.S. Cl.
CPC .............. *G01T 3/008* (2013.01); *G01V 5/0008* (2013.01); *G01T 3/00* (2013.01)

(58) Field of Classification Search
CPC .................................. G01T 3/00; G01T 3/008
USPC ............................................ 250/374, 390.01
See application file for complete search history.

(56) References Cited

U.S. PATENT DOCUMENTS

| | | | |
|---|---|---|---|
| 3,483,377 A | 12/1969 | Borkowski et al. | |
| 4,359,372 A | 11/1982 | Nagai et al. | |
| 4,404,164 A | 9/1983 | Kopp et al. | |
| 4,695,476 A | 9/1987 | Field, Jr. | |
| 5,151,601 A | 9/1992 | Regimand | |
| 5,434,415 A | 7/1995 | Terada et al. | |
| 5,573,747 A | 11/1996 | Lacy | |
| 6,078,039 A | 6/2000 | Lacy | |
| 6,264,597 B1 | 7/2001 | Lacy | |
| 6,426,504 B1 * | 7/2002 | Menlove et al. | 250/390.01 |

(Continued)

FOREIGN PATENT DOCUMENTS

EP 0204565 A 12/1986

OTHER PUBLICATIONS

Boron Coated Straw Detectors as a Replacement for 3He, 2009 IEEE Nuclear Science Symposium Conference Record, p. 119-125 (2009) to Lacy et al.*

(Continued)

*Primary Examiner* — David J Makiya
*Assistant Examiner* — Kenneth J Malkowski
(74) *Attorney, Agent, or Firm* — Hasley Scarano, L.L.P.

(57) ABSTRACT

The present invention includes a method for radiation detection. The present invention utilized boron-coated detectors as a new alternative to large $^3$He tubes that will address the timing limitations of 3He-based detectors in active interrogation systems, by providing a 100-times faster ion collection time. This may enable the counting of prompt neutrons starting within 10 µs following each gamma ray pulse. Current $^3$He-based detectors can only count delayed neutrons, and the linac pulse rate is severely limited by the lengthy times required to count these very late neutrons. If detection of the prompt component can be achieved, up to 150 times more neutrons can be detected in each pulse and pulse rate can be increased by more than 10 fold, giving a net sensitivity gain of 1500 while using the same detection array and linac.

23 Claims, 5 Drawing Sheets

(56) References Cited

U.S. PATENT DOCUMENTS

| | | |
|---|---|---|
| 6,483,114 B1 | 11/2002 | Lacy |
| 6,486,468 B1 | 11/2002 | Lacy |
| 7,002,159 B2 | 2/2006 | Lacy |
| 7,078,704 B2 | 7/2006 | Lacy et al. |
| 2007/0018110 A1 | 1/2007 | McGregor et al. |
| 2009/0074128 A1 | 3/2009 | Bertozzi |
| 2010/0163744 A1 | 7/2010 | Lacy |
| 2010/0301226 A1 | 12/2010 | Lacy |

OTHER PUBLICATIONS

"High Sensitivity Portable Neutron Detector for Fissile Materials Detection", 2005 IEEE Nuclear Science Symposium Conference Record, p. 1010-1013, to Sehad et al.*

Pascual, E., et al. "Boron Carbide Thin Films Deposited by Tuned-Substrate RF Magnetron Sputtering," Diamond and Related Materials, Mar. 1999, pp. 402-405, vol. 8, Amsterdam.

Sharma A. "Properties of Some Gas Mixtures Used in Tracking Detectors." SLAC Journal ICFA 16-3, Jul. 2, 1998.

Sun, L., et al. "A Positron Emission Mammography System Based on 4 mm Straw Detectors," IEEE 2007 Nuclear Science Symposium Conf. Record, Oct. 26-Nov. 3, pp. 3337-3344, vol. 5.

Shehad, N.M., et al. "Small Animal PET Camera Design Based on 2 mm Straw Detectors," IEEE 2006 Nuclear Science Symposium Conference Record, Oct. 29-Nov. 1, pp. 2462-2468, vol. 4.

Shehad, N.M., et al. "Novel Lead-Walled Straw PET Detector for Specialized Imaging Applications," IEEE 2005 Nuclear Science Symposium Conference Record, Oct. 23-29, pp. 2895-2898, vol. 5.

Shehad, N.M., et al. "Ultra-High Resolution PET Detector Using Lead Walled Straws," IEEE 2002 Nuclear Science Symposium Conference Record, Nov. 10-16, pp. 1839-1843, vol. 3.

Lacy, J.L., et al. "Long Range Neutron-Gamma Point Source Detection and Imaging Using Unique Rotating Detector," IEEE 2007 Nuclear Science Symposium Conference Record, pp. 185-191, vol. 1.

Athanasiades, A., et al. "High Sensitivity Portable Neutron Detector for Fissile Materials," IEEE 2005 Nuclear Science Symposium Conference Record, Oct. 23-29, pp. 1009-1013, vol. 2.

Lacy, J.L., et al. "Performance of 1 Meter Straw Detector for High Rate Neutron Imaging," IEEE 2006 Nuclear Science Symposium Conference Record, Oct. 29-Nov. 1, pp. 20-26, vol. 1.

Athanasiades, A., et al. "Straw Detector for High Rate, High Resolution Neutron Imaging," IEEE 2005 Nuclear Science Symposium Conference Record, Oct. 23-29, pp. 623-627, vol. 2.

Lacy, J.L., et al. "Novel Neutron Detector for High Rate Imaging Applications," IEEE 2002 Nuclear Science Symposium Conference Record, Nov. 101-6, pp. 392-396, vol. 1.

\* cited by examiner

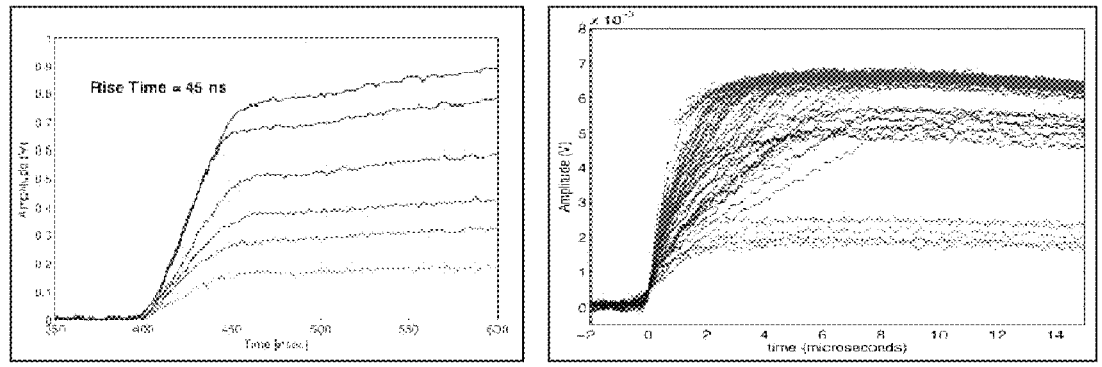
Figure 7
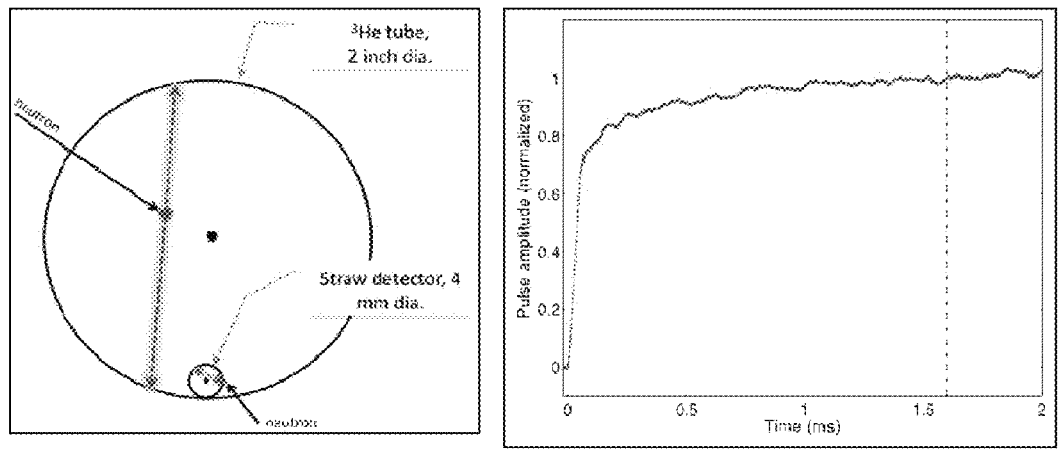
Figure 8
Figure 9

NEUTRON DETECTORS FOR ACTIVE INTERROGATION

CROSS-REFERENCE TO RELATED APPLICATIONS

Claims priority to provisional application 61/333,990 filed May 12, 2010.

STATEMENTS REGARDING FEDERALLY SPONSORED RESEARCH OR DEVELOPMENT

Not applicable.

REFERENCE TO A MICROFICHE APPENDIX

Not Applicable.

BACKGROUND OF THE INVENTION

1. Field of the Invention

This invention relates to radiation detection. More particularly, the invention relates to a method and apparatus for active detection of fissile material with some particular applications in homeland security.

2. Description of the Related Art

Active Interrogation Overview

The detection and characterization of highly enriched uranium (HEU) is desired for monitoring and control, treaty verification and homeland security applications. The passive detection of radiation naturally emitted by HEU is not efficient, because the neutron yield is minute, and gamma rays are of low energy and can be shielded.

Active interrogation methods have been developed and used for some time. For example, see Moss, C. E., Goulding, C. A., Hollas, C. L., & Myers, W. L. (2004). "Neutron Detectors for Active Interrogation of Highly Enriched Uranium." *IEEE TRANSACTIONS ON NUCLEAR SCIENCE*, 51 (4), 1677-1681. They employ pulsed sources that direct an interrogating beam of neutrons or gammas to the suspect HEU material, which in response emits secondary radiations, typically neutrons from fission. Appropriate detectors are then used to count the delayed fission neutrons.

A possible setup is illustrated in FIG. 1, where a linear accelerator (linac) is used to produce bremsstrahlung photons irradiating a cargo container. The photons will induce fission in any HEU material present inside the container, and a detector positioned nearby will detect fission neutrons emitted by the HEU. The number of neutrons counted depends on a number of parameters, including the amount of HEU present, its distance from the detector, size of the detector, the presence of shielding materials, and the measurement time.

Neutron Detectors

The detector requirements for active interrogation of HEU include high detection efficiency for neutron energies around 1 MeV, efficient gamma discrimination, and relatively large sizes, as required in cargo screening applications, for instance. Smaller or portable detectors are also useful when close proximity to the HEU is possible.

Neutron detectors based on pressurized $^3$He gas satisfy the above requirements and are commonly employed in passive detection, as in portal monitoring. In those applications, $^3$He tubes are embedded in moderating material (polyethylene), as pictured in FIG. 2, that thermalizes the high energy neutrons to achieve good detection efficiency. The same configuration can be applied to the detection of 1 MeV fission neutrons, in active interrogation setups. Here, thermal neutron shielding, such as cadmium, must be installed all around the detector assembly, to prevent counting of neutrons that have thermalized in the ground and surrounding structures. A typical response of this detector assembly is shown in FIG. 3. The recorded rate is significantly higher than the background rate, revealing the presence of HEU.

Recovery Time.

It is shown in FIG. 3 that the useful part of the detector response begins after ~3 ms. Prior to that, the detector and electronics are busy counting gamma rays generated by the linac pulse, even though the pulse itself has a period of under 10 μs. The large delay observed in the recovery of the detector response is in part due to the slow drift of ions inside the $^3$He tubes.

$^3$He Inventory and Production.

In addition to the timing limitations, neutron detectors based on $^3$He gas cannot support large deployments, due to the isotope's very limited availability on Earth. The diminishing inventory and minute natural abundance of $^3$He gas necessitate the adoption of new technologies for the detection of neutrons, especially in homeland security and international safeguards applications, where large volume deployments requiring many kilograms of $^3$He are required. The only practical source of $^3$He on Earth is through production of the intermediary radioactive tritium ($^3$H) gas. Tritium decays to $^3$He at a rate of 5.5% per year. Tritium was produced over the time frame from 1955 to 1988 for use as a critical ingredient of nuclear weapons. Production ceased in the US in 1988 and likely will not resume, as there is currently an adequate supply to sustain the diminishing nuclear weapons inventory.

Despite the low and dwindling $^3$He supply, no attractive alternate neutron detector has been successfully identified for large detectors that must have very low gamma sensitivity and low cost. The US Department of Homeland Security (DHS) and Customs and Border Protection (CBP) plan to equip major US ports of entry with large area neutron detectors, in an effort to intercept the smuggling of nuclear materials, potentially used in terrorist attacks. It is estimated that the annual demand of $^3$He for US security applications alone is 22 kiloliters, more than the worldwide supply. See R. L. Kouzes, "The 3He supply problem," PNNL report 18388, April 2009.

This is strongly impacting science applications of $^3$He at neutron scattering facilities, where planned $^3$He detector installations require as many as 20 kiloliters per year worldwide. See Helium detector expert group, "The 3Helium supply crisis and alternative techniques to 3Helium based neutron detectors for neutron scattering applications," Proceedings of meeting held at FRM II, Munich, July 2009, available online at http://cstsp.aaas.org/Helium3/He3%20 Minutes-FRM-II.doc. Safeguards applications, including treaty verification and nuclear waste characterization, demand an additional 20 kiloliters yearly. All in all, we estimate that the projected total $^3$He deficit is more than 60 kiloliters annually. Clearly, alternate neutron detection technologies must be adopted in order to accommodate the rising demand for detectors in the setting of dwindling supply of $^3$He.

The background to the present invention and related art is best understood by reference to Applicant's own prior work, including in particularly, U.S. Pat. No. 7,002,159 B2 (the '159) entitled "Boron Coated Straw Neutron Detector" which issued Feb. 21, 2006. The '159 is hereby incorporated by reference in its entirety, for all purposes, including, but not limited to, supplying background and enabling those skilled in the art to understand, make and use in Applicant's present invention.

Applicant's other issued patents and pending applications may also be relevant, including; (1) U.S. Pat. No. 5,573,747 entitled, "Method for Preparing a Physiological Isotonic Pet Radiopharmaceutical of $^{62}CU$; (2) U.S. Pat. No. 6,078,039 entitled, "Segmental Tube Array High Pressure Gas Proportional Detector for Nuclear Medicine Imaging"; (3) U.S. Pat. No. 6,264,597 entitled, "Intravascular Radiotherapy Employing a Safe Liquid Suspended Short-Lived Source"; (4) U.S. Pat. No. 6,483,114 D1 entitled, "Positron Camera"; (5) U.S. Pat. No. 6,486,468 entitled, "High Resolution, High Pressure Xenon Gamma Rays Spectroscopy Using Primary and Stimulated Light Emissions"; (6) U.S. Pat. No. 7,078,704 entitled, "Cylindrical Ionization Detector with a Resistive Cathode and External Readout"; (7) U.S. patent application Ser. No. 10/571,202, entitled, "Miniaturized $^{62}Zn/^{62}CU$ Generator for High Concentration and Clinical Deliveries of $^{62}CU$ Kit Formulation for the Facile Preparation of Radiolabeled Cu-bis(thiosemicarbazone) Compound"; U.S. patent application Ser. No. 12/483,771 entitled "Long Range Neutron-Gamma Point Source Detection and Imaging Using Rotating Detector"; U.S. patent application No. 61/183,106 entitled "Optimized Detection of Fission Neutrons Using Boron Coated Straw Detectors Distributed in Moderator Material. Each of these listed patents and patent applications are hereby incorporated by reference in their entirety for all purposes.

BRIEF SUMMARY OF THE INVENTION

The present invention includes a method for radiation detection. The present invention utilized boron-coated detectors as a new alternative to large $^3$He tubes that will address the timing limitations of 3He-based detectors in active interrogation systems, by providing a 100-times faster ion collection time. This may enable the counting of prompt neutrons starting within 10 µs following each gamma ray pulse. Current $^3$He-based detectors can only count delayed neutrons, and the linac pulse rate is severely limited by the lengthy times required to count these very late neutrons. If detection of the prompt component can be achieved, up to 150 times more neutrons can be detected in each pulse and pulse rate can be increased by more than 10 fold, giving a net sensitivity gain of 1500 while using the same detection array and linac.

BRIEF DESCRIPTION OF THE DRAWINGS

FIG. 7. Time profiles of typical signals collected in the prototype BCS detectors (left), and a 5 cm diameter 3He tube, pressurized to 2.6 atm (right).

FIG. 8. Cross-sectional diagrams of 5 cm (2 inch) diameter $^3$He detector, and 4 mm diameter BCS detector. The solid arrows point to neutron interactions. The dashed arrows indicate the ionization track following a neutron event.

FIG. 9. Time profile of a neutron signal generated inside a 5 cm diameter 3He tube.

DETAILED DESCRIPTION OF THE INVENTION

Figure 1:
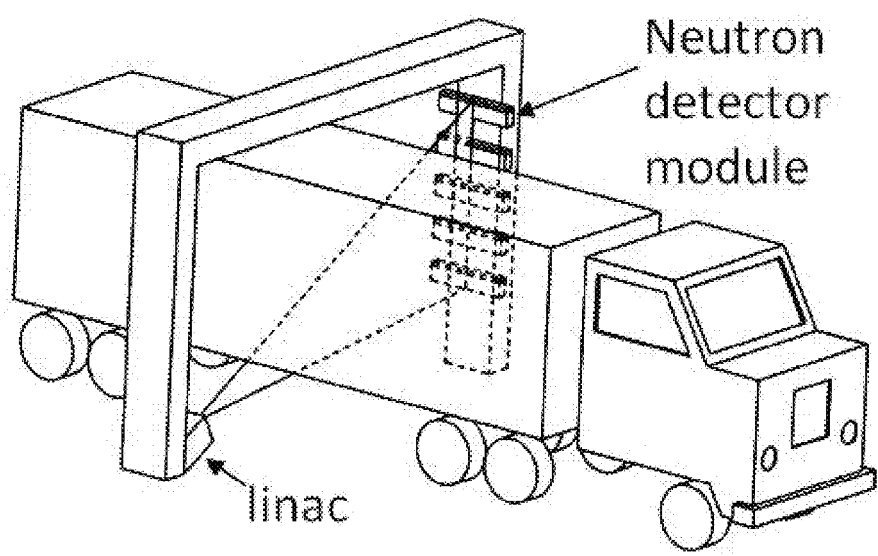
FIG. 1. Active interrogation setup using a linac and neutron detectors. From (Moss, Goulding, Hollas, & Myers, 2004).
Figure 2:
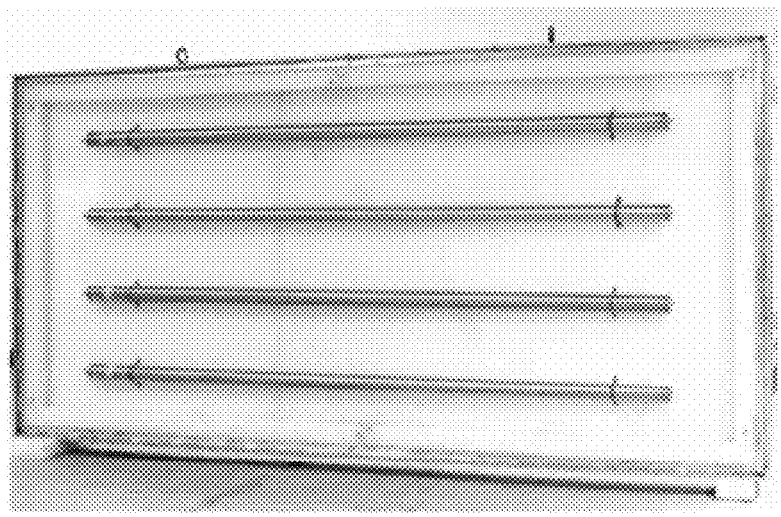
FIG. 2. Long $^3$He tubes (183 cm, 5 cm diameter, 2 atm pressure) embedded in a polyethylene block, used in passive neutron detection. From (Moss, Goulding, Hollas, & Myers, 2004).
Figure 3:
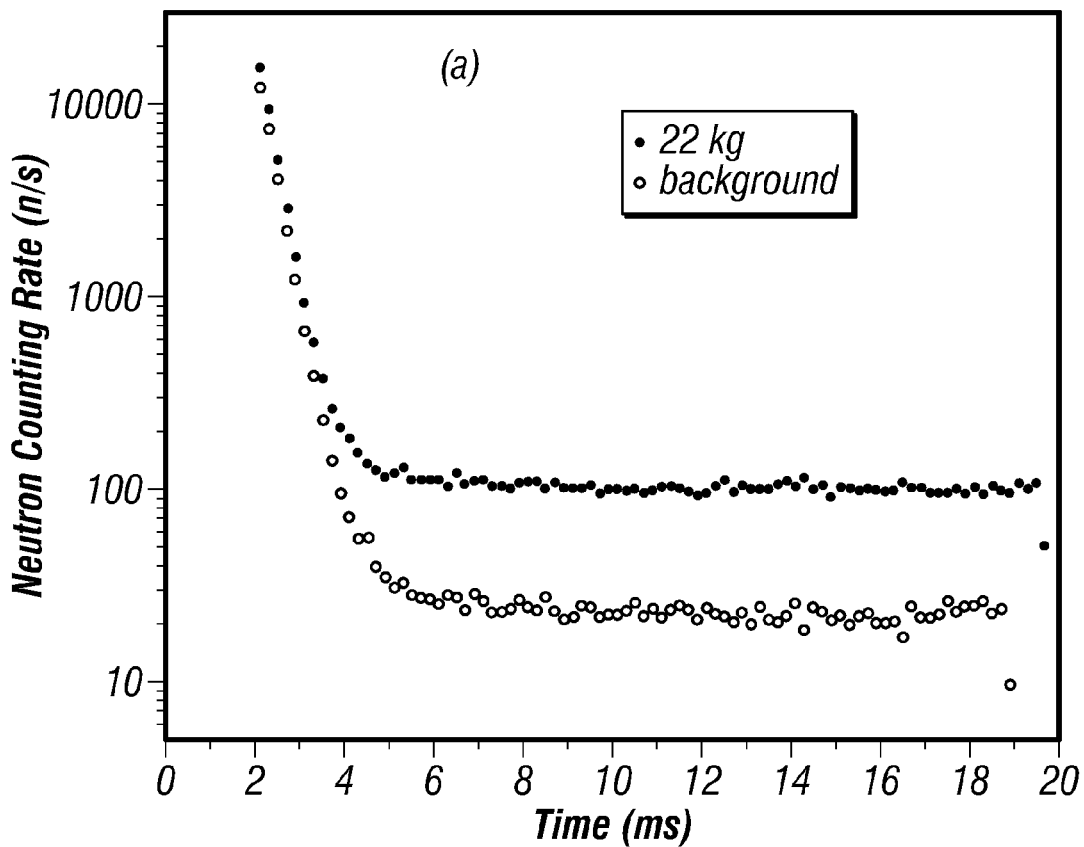
FIG. 3. Neutron count rate recorded in the detector of FIG. 2, during a background measurement, and following linac activation of 22 kg of HEU, placed 7 m from the detector. The background rate was recorded with the linac on, but no HEU present. From (Moss, Goulding, Hollas, & Myers, 2004).
Figure 4:
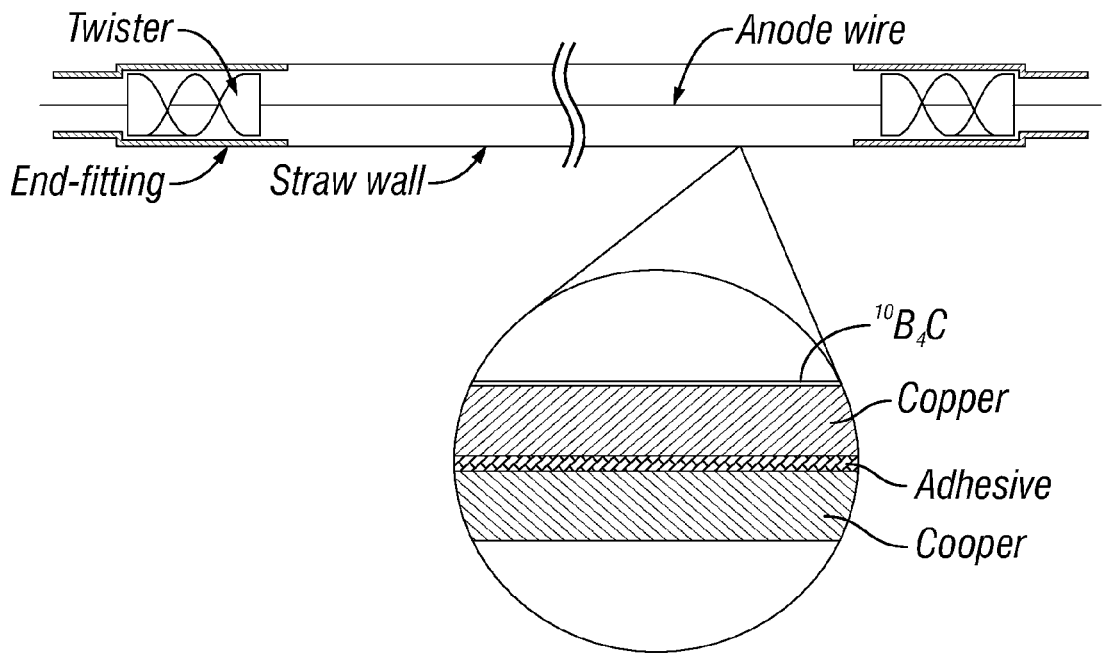
FIG. 4. Axial cross-section of boron-coated straw detector (top), showing main components; and blow-up of straw wall (bottom), showing neutron converter $^{10}B_4C$ and other layers composing the wall.

An embodiment of the present invention is based on long copper tubes ("straws"), 4 mm in diameter, and up to 2 m in length, coated on the inside with a thin layer of $^{10}B$-enriched boron carbide ($^{10}B_4C$), as shown in FIG. 4. The present invention comprises combining thin-walled, boron coated straw tube detectors with a plastic moderator material interspersed around the tubes. Thermal neutrons captured in $^{10}B$ are converted into secondary particles, through the $^{10}B(n,\alpha)$ reaction:

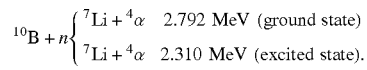

The reaction products, namely an alpha particle (α) and a lithium nucleus ($^7$Li) are emitted isotropically from the point of neutron capture in exactly opposite directions and, in the case of the dominant excited state, with kinetic energies of 1.47 MeV and 0.84 MeV, respectively (dictated by the conservation of energy and momentum). Since the boron carbide layer is very thin, typically 1 µm, one or the other of the two charged particles (whichever is directed inward) has a high probability to escape the wall and ionize the gas contained within the straw. In an argon-based gas used for counting medium the ionization density in the gas is very high even at atmospheric pressure. Thus even in a rather small 4 mm tube a large fraction of the escape energy of either the α or $^7$Li particle is deposited in the gas. (usually ~100% of the escaping Li energy is absorbed and a large fraction of alpha energy.)

Each straw detector is operated as a proportional counter, with its wall acting as the cathode, and a thin wire tensioned through its center serving as the anode electrode, operated at a high positive potential. Primary electrons liberated in the gas drift to the anode, and in the high electric field close to the anode, avalanche multiplication occurs, delivering a very much amplified charge on the anode wire. A standard charge-sensitive preamplifier and shaping circuitry are used to produce a low noise pulse for each neutron event. Gamma interactions in the wall produce near minimum ionizing electrons that deposit a small fraction of the energy of the heavily ionizing alpha and Li products. Gamma signals are effectively discriminated with a simple pulse height cut.

Experimental Validation

In addition to high abundance and very low cost of boron, the boron-coated straw detector offers distinct advantages over conventional ³He-based neutron detectors, including faster signals, short recovery time (ion drift), low weight, safety for portable use (no pressurization), and low cost.

Pulse Height Spectra.

Figure 5:
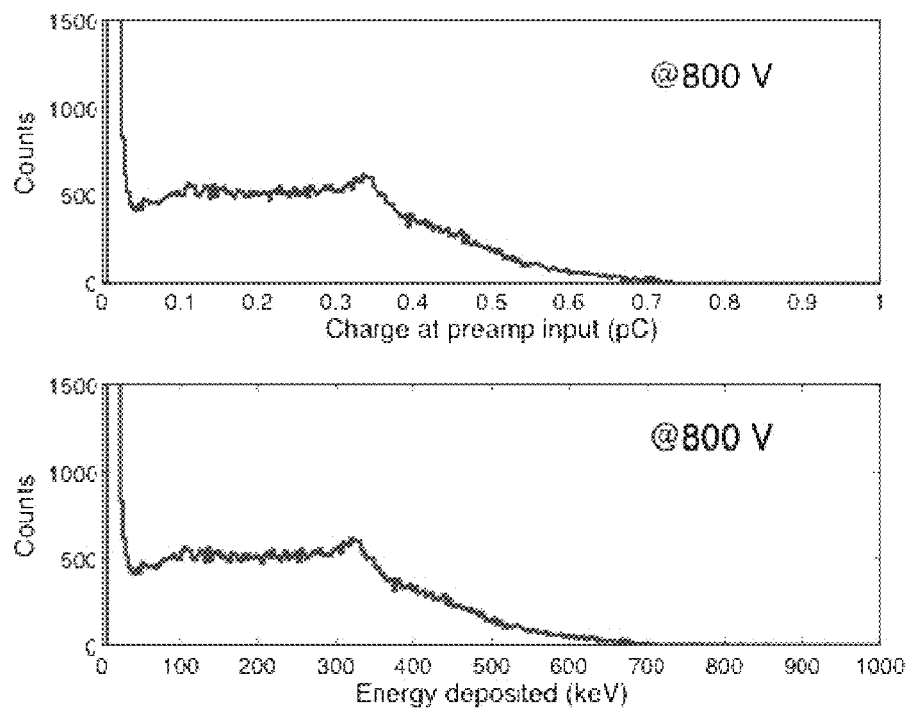
FIG. 5. Pulse height spectra measured in a close-packed array of BCS detectors, with a moderated 252Cf source. The same spectrum is calibrated for charge generated in the detectors (top) and for the energy deposited (bottom).

FIG. 5 shows the pulse height spectra collected in an array of BCS detectors, operated with a gas mixture of Ar/CO2 (90/10) at 800 V, and with a 252Cf neutron source. The abscissa is scaled for the amplitude of the multiplied charge arriving at the preamp (top panel), or the amount of energy deposited in the gas. Due to the small diameter of the BCS, only a fraction of the available particle energy is deposited, however, the energy is sufficient to successfully reject gamma rays, which deposit less than 40 keV. The charge delivered to the preamp is significant, and can reach up to 0.7 pC at this bias level, with a corresponding gas multiplication factor of 160.

Figure 6:
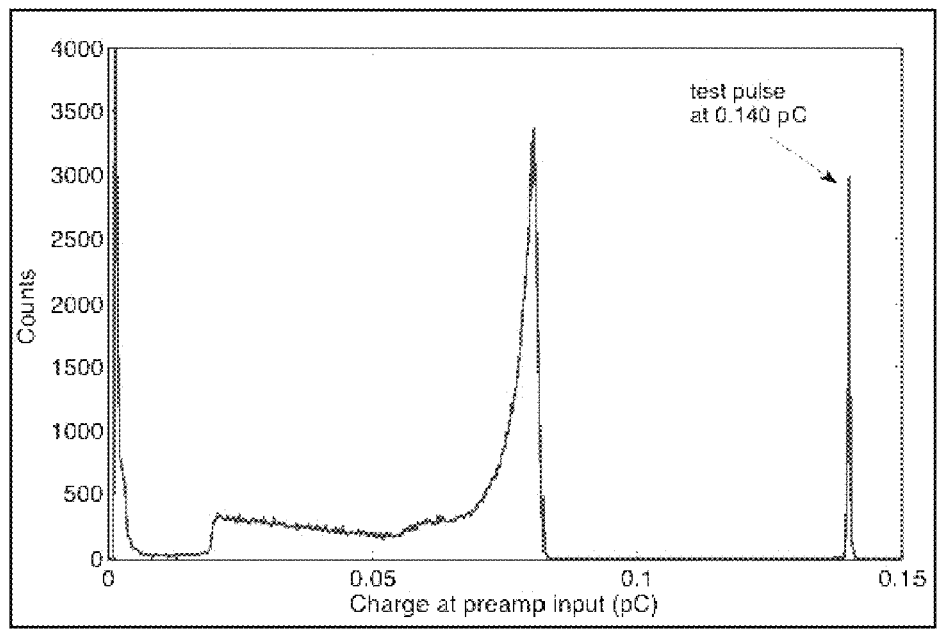
FIG. 6. Pulse height spectrum collected in a 3He tube, with a moderated 252Cf source. The tube had a 5 cm diameter, and contained 3He at 2.6 atm.

A typical pulse height spectrum collected in a ³He tube, pressurized to 2.6 atm, is shown in FIG. 6. The tube had a diameter of 5 cm, active length of 35.6 cm, and was biased to 1100 V. The full energy peak at 764 keV corresponds to a detector charge of 80 fC, significantly lower than the level achieved with the straw detector at voltages as low as 800 V. This is in part due to the lower kinetic energy imparted to the reaction products, but also due to the larger energy required to liberate ion pairs in He (42 keV in He, versus 26 keV in Ar).

Counting gas. Since neutrons are converted inside the wall of the BCS detector, the counting gas mixture can be selected to satisfy the requirements of a particular application. A wide range of mixtures can be used, including Ar/CO2, He/CO2, Ar/CH4, Xe/CO2, and Xe/CH4. No pressurization is necessary, and the gas can be replaced as needed, at minimal cost.

Rise Time.

FIG. 7 shows the time profile of typical signals generated in the straw detector. The fast component associated with the drift of electrons to the anode wire has a rise time of 45 ns. Since all ionizing tracks start at the wall, signals exhibit similar profiles. By comparison, typical signals generated in the 3He tube exhibit rise times that are as much as 150 times slower, varying between 900 and 7000 ns, as shown in the figure. Signals were collected with a Canberra preamplifier (model 2006), configured with a 6.8 pF feedback capacitor and 100 MW resistor.

The variation is attributed to the random location of neutron interactions within the gas volume, illustrated in FIG. 8 and the orientation of the ionizing tracks in relation to the tube axis [10]. Since ³He tube diameters are typically large (5 cm in this case), electron drift times are long, resulting in slow signal formation.

Ion Drift.

Common ³He tube designs exhibit long recovery times, on the order of 2 ms, due to the slow drift of ions inside the pressurized ³He gas. The ion collection time can be calculated using the relation. See Ravazzani, Para, A. F., Jaime, R., Looman, M., Ferrer, M. M., Peerani, P., et al. (2006). Characterizations of 3He proportional counters. *Radiation Measurements*, 41, 582-593:

$$T_{ion} = \frac{P \cdot \ln(b/a)}{2 \cdot V \cdot \mu_{ion}} (b^2 - a^2) \quad (2)$$

where a and b are the anode and cathode radii, respectively, P is the gas pressure, V is the applied potential and $\mu_{ion}$ is the ion mobility. Even though the mobility of ions in pure ³He is good, at 26 cm²·atm·V⁻¹·s⁻¹, the large diameter of the tube, and high pressure result in a long overall drift time. Using the above formula, a 5 cm diameter ³He tube, pressurized to just 2 atm, and operated at 1100 V, will have a 1.5 ms collection time. In a separate experiment with a similar ³He tube we were able to capture the time profile of signals and measured a collection time of 1.6 ms, as shown in FIG. 9.

Preferred embodiments include those in which the gas mixture is optimized through use of high mobility gas components to provide rapid positive ion collection time of less than 50 μs. Since neutrons are converted inside the wall of the BCS detector, the counting gas mixture can be selected to achieve fast ion drift times. Preferred embodiments include those in which the positive ions generated in the optimized gas mixture have a drift velocity at the cathode of 900 cm/s, or higher. Using (2), we obtain an ion collection time in the 4 mm straw detectors of 77 μs, when operated with a gas mixture of Ar/CO₂, at 1 atm, and with an applied potential of 800 V. This value is about 20 times faster than the corresponding collection time in the ³He tube presented earlier. The ion mobility of CO₂ ions in argon is 1.72 cm²·atm·V⁻¹·s⁻¹ (see Sauli, F. (1977). Principles of Operation of Multiwire Proportional and Drift Chambers. CERN), significantly lower than that for ³He ions, however, the small straw diameter and low pressure result in a much faster response. Preferred embodiments include those in which the positive ions generated in the optimized gas mixture have a mobility of 1.3 cm²·atm·V⁻¹·s⁻¹ or higher, to facilitate faster collection of positive ions.

Figure 10:
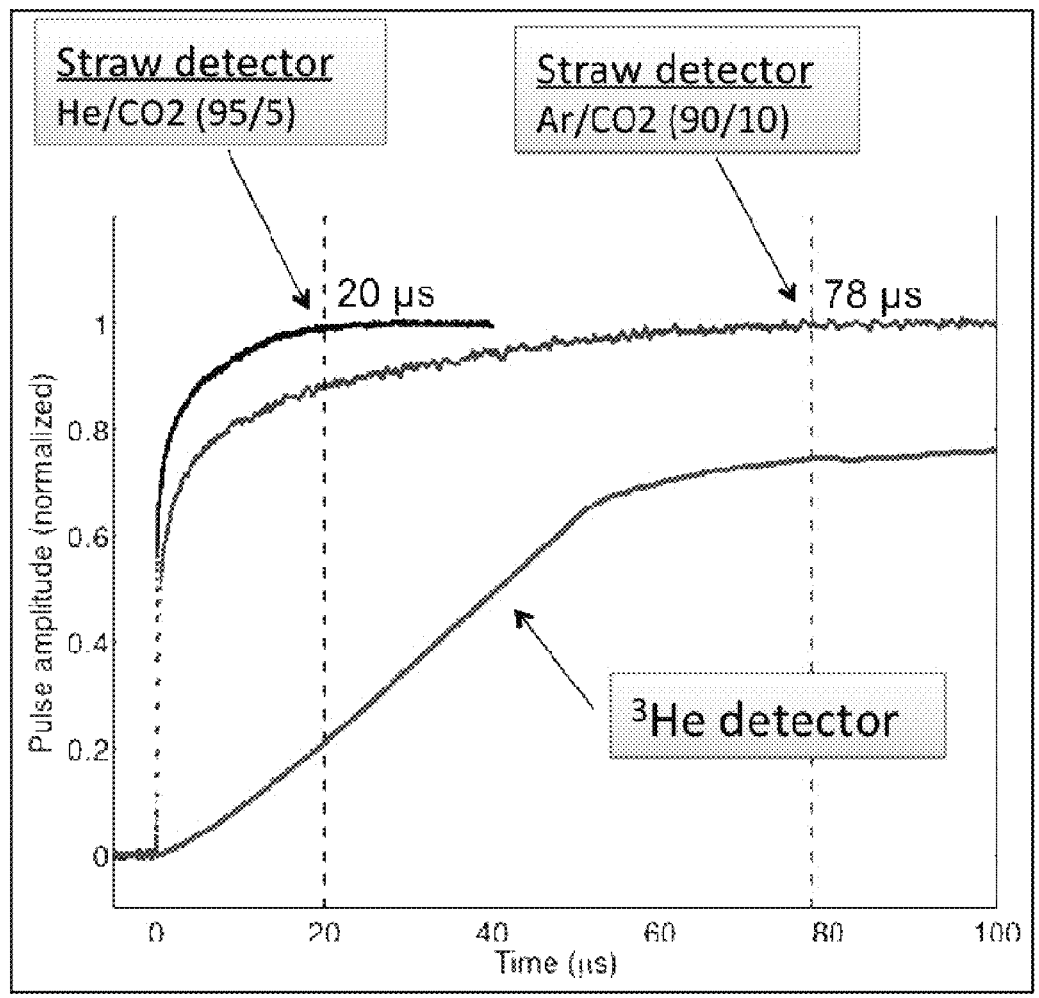
FIG. 10. Time profiles of neutron signals generated inside a 4 mm diameter boron-coated straw detector, and a 5 cm diameter $^3$He tube. The straw detector was operated with two different gas mixtures, as indicated.

The time profile of neutron signals was captured in a straw detector operated with Ar/CO₂ and He/CO₂ gas mixtures, as shown in FIG. 10. The helium mixture offers an even faster collection time of 20 μs, 80 times faster than the ³He tube.

Further improvements in collection time can be achieved by noting that the collection time formula (2) shows that collection time is proportional to gas pressure. In a sealed straw system the operating pressure can be set to small fractions of an atmosphere. However it must be noted that collection time is inversely proportional to operating voltage V. Some decrease in operating voltage is desirable when pressure is reduced to maintain comparable gas gain. For example reduction of pressure in a 4 mm straw from 1 atmosphere to 0.75 atm reduces the operating voltage from 800 volts to 700 volts. Nonetheless the ratio of P/V in expression (2) decreases by 17% decreasing the collection time by the same factor. Hence in order to minimize the collection time, the pressure in the straw should be operated at the minimum level feasible without compromising gas gain and without decreasing the deposited ionization to unacceptable levels. Preferred embodiments include those in which the absolute pressure of the gas mixture contained within the boron-coated straw is selected within the range 0.7 atm down to 0.1 atm, in order to decrease the ion collection time as result of the increase in ion mobility at lower pressures.

Yet further improvements in collection time can be achieved by noting that the operating voltage of a straw giving the same avalanche gain increases as the anode wire diameter is increased. Increase in the anode wire radius a in expression (2) also produces a slight decrease in collection time since b/a decreases. For a 90% Ar 10% CO2 gas using the Diethorn gain formula $$\ln M = \frac{V}{\ln(b/a)} \cdot \frac{\ln 2}{\Delta V} \left( \ln \frac{V}{P \cdot a \ln(b/a)} \cdot \ln K \right)$$

we find that a 4 mm straw operated at 1 atm with 40 um wire diameter will provide a gain of 190 at an operating voltage of 1000 volts. If the wire diameter changes to 20 um the same gain of 190 is achieved at 810 volts. Thus the ion collection time is decreased by a factor of 1000/810=1.23. If in addition the pressure is reduced to 0.5 atm for the 40 um wire then the ion collection time is decreased by a total factor of 2.3. In turn if the pressure is reduced, the wire diameter is increased AND a gas having faster ion drift velocity is used another large decrement in collection time can be achieved. Preferred embodiments include those in which the anode wire comprises a diameter in the range of 30 µm up to 50 µm to take advantage of the resulting increase in operating voltage that in turn decreases ion collection time.

I claim:

1. A neutron detection apparatus comprising:
    a linear accelerator, said accelerator emanating a pulsed interrogating beam for inducing photon induced fission in nuclear materials;
    a plurality of boron-coated straw detectors, said straw detectors having a small diameter of about 4 mm or less;
    a moderator material interspersed between said straw detectors;
    a gas mixture, internal to said straw detectors, optimized for the rapid collection of positive ions through use of at least one noble gas combined with at least one quench gas in order to detect neutrons following photon-induced fission in nuclear materials; and
    a wire through the center of the straw acting as an anode, said wire collecting positive ions in order to detect neutrons following photon-induced fission in nuclear materials.

2. The apparatus of claim 1 wherein the gas mixture is optimized through use of at least one noble gas combined with at least one quench gas to provide rapid positive ion collection time of less than 50 µs.

3. The apparatus of claim 1 wherein the positive ions generated in the optimized gas mixture have a drift velocity at the cathode of 900 cm/s, or higher.

4. The apparatus of claim 1 wherein the positive ions generated in the optimized gas mixture have a mobility of 1.3 $cm^2 \cdot atm \cdot V^{-1} \cdot s^{-1}$ or higher, to facilitate faster collection of positive ions.

5. The apparatus of claim 1 wherein the absolute pressure of the gas mixture contained within the boron-coated straw is selected within the range 0.7 atm down to 0.1 atm, in order to decrease the ion collection time as result of the increase in ion mobility at lower pressures.

6. The apparatus of claim 1 wherein the gas mixture contained within the boron coated straw detectors is $Ar/CO_2$.

7. The apparatus of claim 1 wherein the gas mixture contained within the boron coated straw detectors is $Ar/CH_4$.

8. The apparatus of claim 1 wherein the gas mixture contained within the boron coated straw detectors is $He/CO_2$.

9. The apparatus of claim 1 wherein the gas mixture contained within the boron coated straw detectors is $Xe/CO_2$.

10. The apparatus of claim 1 wherein the gas mixture contained within the boron coated straw detectors is $Xe/CH_4$.

11. A neutron detection apparatus comprising:
    a plurality of boron-coated straw detectors, said straw detectors having a small diameter of about 4 mm or less;
    a moderator material interspersed between said straw detectors;
    a gas mixture, internal to said straw detectors, optimized for the rapid collection of positive ions through use of at least one noble gas combined with at least one quench gas in order to detect neutrons following photon-induced fission in nuclear materials; and
    a wire through the center of the straw acting as an anode, said wire having a diameter in the range of 30 µm up to 50 µm to take advantage of the resulting increase in operating voltage that in turn decreases ion collection time in order to detect neutrons following photon-induced fission in nuclear materials.

12. The apparatus of claim 1 wherein the gas mixture is optimized through use of at least one noble gas combined with at least one quench gas to provide rapid positive ion collection time of less than 50 µs; and
    wherein the absolute pressure of the gas mixture contained within the boron-coated straw is selected within the range 0.7 atm down to 0.1 atm, in order to decrease the ion collection time as result of the increase in ion mobility at lower pressures,
    to arrive at an optimal reduction of ion collection time.

13. The apparatus of claim 11 wherein the gas mixture is optimized through use of at least one noble gas combined with at least one quench gas to provide rapid positive ion collection time of less than 50 µs
    to arrive at an optimal reduction of ion collection time.

14. The apparatus of claim 11 wherein the absolute pressure of the gas mixture contained within the boron-coated straw is selected within the range 0.7 atm down to 0.1 atm, in order to decrease the ion collection time as result of the increase in ion mobility at lower pressures
    to arrive at an optimal reduction of ion collection time.

15. The apparatus of claim 11 wherein the gas mixture is optimized through use of at least one noble gas combined with at least one quench gas to provide rapid positive ion collection time of less than 50 µs; and
    wherein the absolute pressure of the gas mixture contained within the boron-coated straw is selected within the range 0.7 atm down to 0.1 atm, in order to decrease the ion collection time as result of the increase in ion mobility at lower pressures
    to arrive at an optimal reduction of ion collection time.

16. The apparatus of claim 15 wherein the gas mixture contained within the boron coated straw detectors comprises helium.

17. The apparatus of claim 11 wherein the positive ions generated in the optimized gas mixture have a drift velocity at the cathode of 900 cm/s, or higher.

18. The apparatus of claim 11 wherein the positive ions generated in the optimized gas mixture have a mobility of 1.3 $cm^2 \cdot atm \cdot V^{-1} \cdot s^{-1}$ or higher, to facilitate faster collection of positive ions.

19. A method of neutron detection comprising:
    providing a neutron detector comprising a plurality of boron-coated straws, a moderator material interspersed between said straws, a gas mixture internal to said straws optimized for the rapid collection of positive ions through use of at least one noble gas combined with at least one quench gas in order to detect neutrons following photon-induced fission in nuclear materials, and wires passing through the longitudinal centers of said straws acting as an anode;
    directing a beam of gamma or neutron pulses toward suspected nuclear materials;
    detecting neutron emissions from the suspected nuclear materials by collecting positive ions generated within the boron-coated straws as a result of interaction with neutron emissions from the nuclear materials within less than 50 µs from the beginning of each pulse.

20. The method of claim 19, wherein the gas mixture comprises at least one noble gas combined with at least one quench gas, said gas having an absolute pressure of between about 0.7 and 0.1 atm.

21. The method of claim 19, wherein the gas mixture comprises helium.

22. The method of claim 19, wherein the anode wire comprises a diameter in the range of 30 to 50 μm.

23. The method of claim 19, wherein the detecting step collects positive ions generated within the boron-coated straws as a result of interaction with neutron emissions from the nuclear materials within less than 10 μs from the beginning of each pulse.

* * * * *